United States Patent [19]

Takase et al.

[11] Patent Number: 4,595,667

[45] Date of Patent: Jun. 17, 1986

[54] CATALYST FOR THE HYDROTREATING OF HEAVY HYDROCARBON OILS

[75] Inventors: Shinji Takase; Akira Inoue; Tatuo Omata, all of Yokohama; Masao Mori, Yokosuka; Yoshihiro Yamazaki; Tatsuki Kubo, both of Kawasaki, all of Japan

[73] Assignee: Nippon Oil Co., Ltd., Tokyo, Japan

[21] Appl. No.: 722,821

[22] Filed: Apr. 12, 1985

[30] Foreign Application Priority Data

Apr. 27, 1984 [JP] Japan ................................ 59-83648

[51] Int. Cl.$^4$ ............................................. B01J 21/16
[52] U.S. Cl. .................................... 502/63; 502/84; 502/527
[58] Field of Search ............................ 502/84, 63, 527

[56] References Cited

U.S. PATENT DOCUMENTS

| | | | |
|---|---|---|---|
| 2,410,436 | 11/1946 | Ewing | 502/84 X |
| 4,166,026 | 8/1979 | Fukui et al. | 502/84 X |
| 4,196,102 | 4/1980 | Inooka et al. | 502/84 X |
| 4,364,857 | 12/1982 | Santilli | 502/527 X |
| 4,465,789 | 8/1964 | Lindsley | 502/527 X |
| 4,548,912 | 10/1985 | Hettinger et al. | 502/527 X |

FOREIGN PATENT DOCUMENTS

| | | | |
|---|---|---|---|
| 35905 | 3/1980 | Japan | 502/84 |
| 2063699 | 1/1981 | United Kingdom | 502/84 |

*Primary Examiner*—Carl F. Dees
*Attorney, Agent, or Firm*—Bucknam and Archer

[57] ABSTRACT

This invention relates to a catalyst for the hydrotreating of heavy hydrocarbon oils, which catalyst comprises a dual structure including a porous core (1), made chiefly of alumina, which has micropores having an average size smaller than 170 angstrom and to which at least one active metal is applied, and a surface layer (2) comprised mainly of at least one clay mineral selected from the group consisting of sepiolite, halloysite, attapulgite, palygorskite, and asbestos. The active metal may be applied to the surface layer (2) as desired.

14 Claims, No Drawings

CATALYST FOR THE HYDROTREATING OF HEAVY HYDROCARBON OILS

DESCRIPTION

This invention relates to catalysts for the hydrotreating of heavy hydrocarbon oils and more particularly, to such catalysts having a dual or two-layer structure which permits high desulfurization activity to be held over a long term.

Heavy hydrocarbon oils ordinarily contain nondistillable, high-molecular-weight carbonaceous (coke) precursors, called asphaltene, which are insoluble in a light hydrocarbon such as pentane or heptane, and also undesirable impurities such as organometallic compounds containing nickel and vanadium, sulfur compounds, and nitrogen compounds. These impurities are contained, in large amounts, in high molecular weight hydrocarbon fractions such as asphaltene, which is the main cause for difficulties in catalytic hydrotreating of heavy hydrocarbon oils.

Accordingly, heavy hydrocarbon oils are usually subjected to hydrotreating in order that not only high molecular weight hydrocarbon fractions, such as asphaltene, contained in the heavy hydrocarbon oils are converted into light fraction oils, but also contaminants such as metallic, sulfur and nitrogen compounds as mentioned above are removed or reduced in concentrations.

At present, in the process of hydrotreating such heavy hydrocarbon oils to obtain light fraction oils of high quality, there are used, as catalysts, active metals supported on porous carriers, typically porous alumina. One of the problems involved in the hydrotreating process is that the activity of the catalyst used becomes lower within a relatively short time (this being short catalyst life in a word).

This is because heavy hydrocarbon oils contain asphaltene as described above, which not only contain heavy metals such as nickel and vanadium in large amounts, but also have a tendency toward deposition of carbonaceous substances (coke), whereby the micropores in the hydrotreating catalyst are clogged with the heavy metals or carbonaceous deposits.

In view of these disadvantages, efforts have been made to develop catalysts for hydrotreating which have high desulfurization activity durable stably over a long term. In order to overcome the problems involved in the prior art, a variety of hydrotreating techniques have been proposed.

The thus proposed hydrotreating techniques may be broadly classified into the following groups with respect to catalysts.

(1) Hydrotreating processes (Japanese Laid-open Patent Application Nos. 50-67787 and 54-139904) using micropore catalysts (having an average pore diameter below about 100 angstrom).

(2) Hydrotreating processes (Japanese Laid-open Patent Application Nos. 53-23303, 54-23096, 54-127406, and 55-119445) using moderate-size pore catalysts (having an average pore diameter of from 100 to 200 angstrom).

(3) Hydrotreating, demetallation processes (Japanese Patent Publication Nos. 45-38146, 48-17443, and 50-3081) using macroporous catalysts (having a majority of pores with an average diameter of not smaller than about 200 angstrom).

However, any hydrotreating techniques mentioned above do not fundamentally solve the prior-art technical problems inherently involved in the hydrotreating of heavy hydrocarbon oils containing asphaltene and heavy metals, and are thus not satisfactory. The problems of the proposed catalysts are summarized as follows.

The catalysts of group (1) are catalysts which have micropores of such a narrow size distribution, as to restrict asphaltene molecules to enter the pores in order to cope with the troubles resulting from metal compounds in heavy hydrocarbon oils. In this sense, the catalysts are disadvantageous in that they do rarely take part in metal elimination, desulfurization and denitrogenation of asphaltene, and that the catalysts are apt to be clogged at the mouth of micropores by deposition of metals and carbonaceous materials.

The catalysts of group (2) are catalysts which have widely been utilized industrially for hydrotreating of topped crude. These catalysts will make it possible to, more or less, mitigate deactivity which is caused by heavy metals and asphaltene in feedstocks. However, the micropores of the catalyst are rapidly reduced at the mouth of pores thereof by accumulation of the metals, which will considerably impede diffusion, in the micropores, of molecules such as asphaltene. Thus, the catalysts have the drawback that limitation is placed on the content of asphaltene in feedstocks.

The catalysts of group (3) are catalysts whose pores are designed to mostly have a diameter not smaller than 200 angstrom in order to facilitate diffusion of the metal compounds in the pores. If the pore size of the catalyst is made larger, the diffusion in the pores of high molecular weight compounds containing heavy metals in great amounts is promoted, but the surface area of the catalyst lowers appreciably. With catalysts having macropores in which a majority of pores have a diameter not smaller than 700 angstrom, adequate mechanical strength cannot be obtained, so that they are liable to break or being broken into pieces at the time of charging of the catalyst into a reactor or during usage.

An object of the invention is to provide a catalyst for hydrotreating which can overcome the problems of the prior art and which has high desulfurization activity over a long term.

The present invention relates to a catalyst for the hydrotreating of heavy hydrocarbon oils, which catalyst comprises a dual structure including a porous core (1), made chiefly of alumina, which has micropores having an average size smaller than 170 angstrom and to which at least one active metal is applied, and a surface layer (2) comprised mainly of at least one clay mineral selected from the group consisting of sepiolite, halloysite, attapulgite, palygorskite and asbestos. Active metals may be further applied to the surface layer.

The term "heavy hydrocarbon oil(s)" used herein is intended to mean hydrocarbon oils comprising fractions whose boiling point exceeds 300° C. Examples of such oils include crude oils, residual oils obtained by topping of crude oils, residual oils and distillates obtained by vacuum distillation of crude oils, solvent-deasphalted oils of residual oils obtained by topping or vacuum distillation of crude oils, crude oils obtained by extraction from tar sand, oils obtained by catalytic cracking, coal liquefaction oils, and mixtures, thereof.

The component (1) constituting the core of the catalyst according to the invention is a porous substance composed mainly of alumina, on which at least one active metal is supported.

Alumina used in the present invention may be of any crystal structures such as of χ-, γ-, η-, κ- and θ-alumina. Of these, γ-alumina is preferably used.

The method of preparing alumina used to form the core of the catalyst of the invention is not critical, and any known techniques may be used in the practice of the invention. For instance, alumina is prepared by adding an acid or base to a solution of a soluble aluminum compound such as aluminum chloride, aluminum sulfate, sodium aluminate or aluminum alkoxide, thereby forming alumina hydrate, and drying and calcining the hydrate. Other ingredients may be incorporated into alumina, for example, by co-precipitation of other ingredients upon formation of the alumina hydrate. Aside from alumina, at least one member selected from silica, boria, titania, magnesia, zirconia, beryllia, chromia, zeolite, phosphorus, and fluorine may be used in an amount of about 1 to 25 wt.%.

The average diameter of the porous core or component (1) is generally in the range below 170 angstroms, preferably from 40 to 150 angstroms. Over 170 angstroms, the surface area of the catalyst becomes lower and thus the desulfurization activity lowers disadvantageously.

The pore volume of the component (1) is generally not less than 0.3 cc/g, preferably from 0.3 to 1.0 cc/g. When the average pore volume is below 0.3 cc/g, the surface area of the catalyst becomes lower with a lowering of the desulfurization activity.

The shape of the component (1) may be in any known form including a sphere and a cylinder, which has an average corresponding diameter of from 0.1 to 10 mm, preferably from 0.3 to 2.0 mm.

Fresh or regenerated catalysts, which have been prepared by known techniques may be used as the component (1) provided that such catalysts have such a composition as defined in the present invention with respect to the component (1).

The component (2), which constitutes the surface or external layer of the catalyst of the invention, should not be of a plate-like or granular structure but should be composed chiefly of long, fine (or hollow), natural or synthetic clay minerals. The natural and synthetic clay minerals include, for example, sepiolite, halloysite, attapulgite, palygorskite, and asbestos. These minerals may be used singly or in combination. Aside from the natural and synthetic clay minerals, about 1 to 45 wt.% of alumina, silica, and silica-alumina may be used in combination. Preferably, a clay mineral composed mainly of sepiolite is used.

The average pore diameter of the component (2) is in the range of from 100 to 700 angstrom, preferably from 120 to 500 angstrom, and most preferably from 170 to 500 angstrom. If the average pore diameter is smaller than 100 angstrom, heavy metals and asphaltene in feedstocks cannot infiltrate into the surface layer of the catalyst, but the heavy metals and carbon deposit or settle at the mouth of the pores in the surface layer. This leads to the disadvantage that desulfurization and demetallation activity is lower. On the other hand, when the average size exceeds 700 angstrom, the mechanical strength of the catalyst is lower. The component (2) should have an average pore volume of not less than 0.3 cc/g, preferably from 0.4 to 3.0 cc/g. When the average pore volume is less than 0.3 cc/g, micropores are rapidly reduced in sectional area by accumulation of the heavy metals in feedstocks. Thus, metal-eliminating and desulfurizing activities become lower.

In the practice of the invention, natural or synthetic clay minerals, which have been reduced into 100 to 325 mesh pieces, may be used as they are. Alternatively, the pieces may be used after being calcined at high temperatures. They are calcined in the temperature range of from 300° to 800° C. Sepiolite may be also called meerschaum, which is a fibrous clay mineral having a double-chain structure. Sepiolite naturally occurs as hydrous magnesia silicate, but may be synthesized from magnesium salt and silicate.

Halloysite is a kind of aluminum silicate clay which is of a fibrous and plate-like structure and often occurs naturally. This is represented by the following basic formula, $Al_2Si_2O_2(OH)_4$. In particular, fibrous halloysite is preferably used. Attapulgite and palygorskite are porous clay minerals which have such a double-chain structure as sepiolite. Asbestos may be called amiantus and includes two types of asbestos based on serpentine and amphibole, respectively. These rocks are mainly composed of anhydrous magnesium silicate and are an aggregate of very fine fibers.

The active metals supported on the components (1) and (2) may be any metals used in ordinary hydrotreating catalysts. At least one active metal is supported on the components.

The active metals are transition metals of groups Vb, VIb, VIII and Ib of the Periodic Table. Of these, vanadium, molybdenum, tungsten, chromium, cobalt, nickel, and copper are preferred. These active metals are effective when used in the metallic state, or in the form of metal oxides or metal sulfides. Alternatively, part of the active metals may exist as combined with a carrier by ion-exchanging techniques.

The amount of the active metal is in the range of about from 0.1 to 20 wt.%, preferably from 1 to 15 wt.%, of the total weight of the component (1) and/or component (2) when calculated as a metallic element because the active metal may take various forms as mentioned above.

These active metals will predominantly control activities on various reactions involved in the hydrotreating of heavy hydrocarbon oils, e.g. desulfurization, denitrogenation, demetallation, hydrocracking, and decomposition of asphaltene.

The active metals may be supported by any methods including dipping,, ion-exchanging, kneading and other known techniques.

The same or different type of active metal may be applied to the core (1) and the surface layer (2) in the same or different amounts, if active metals are preferably applied to both core and surface layer.

The average pore diameter used herein means the value defined according to the following equation and expressed in terms of angstrom.

$$\text{Average pore diameter} = 4 \times PV \times 10^4 / SA \quad (1)$$

in which PV and SA represent, respectively, a total pore volume and a total surface area of pores, having a diameter ranging from 35 to 10000 angstrom, in unit weight of a catalyst or carrier, and the units of PV and SA are expressed by cc/g and m²/g, respectively. Unless otherwise indicated, the total pore volume and the total surface area of pores, having a diameter of from 35 to 1000 angstrom, per unit weight of a catalyst or carrier will be hereinafter referred to simply as a pore volume and a surface area of a catalyst or carrier.

The pore diameter, pore volume, and surface area of a catalyst and a carrier are determined by a so-called mercury porocimetry (as described in "E. W. Washburn, Proc. Natl. Acad. Sci., 7, p. 115 (1921)", "H. L. Ritter, I. E. Drake, Ind. Eng. Chem. Anal., 17, p. 782, p. 787 (1945)", and "L. C. Drake, Ind. Eng. Chem., 41, p. 780 (1949)") using Autopore 9200 (available from Micromeritex Co., Ltd., of United States). In practice, the surface tension of mercury is taken as 484 dynes/cm at 25° C. and an angle of contact used is taken as 140°, and an absolute mercury pressure is changed from 0.035 to 4200 kg/cm². Assuming that a pore model is in the form of a cylinder, a diameter of a pore having a size over 35 angstrom can be represented by the following formula (2):

$$\text{Pore diameter (angstrom)} = \frac{148300}{\text{absolute mercury pressure (kg/cm}^2\text{)}} \quad (2)$$

The average corresponding diameter used herein is defined according to the following equation (3).

$$\text{Average corresponding diameter (mm)} = \frac{6 \times \text{average volume of particles (mm}^3\text{)}}{\text{average outer surface area of particles (mm}^2\text{)}} \quad (3)$$

The average volume and average outer surface area used above are measured by suitable methods, and expressed in terms of a volume and an outer surface area, respectively, corresponding to a sphere having such an average diameter. The measuring methods include, for example, direct measurement, sifting, and settling.

The catalyst of the invention comprises a dual structure which has a porous core (1) made chiefly of alumina, and a surface or external layer (2) made chiefly of clay minerals.

The proportion of the surface layer in the catalyst is in the range of from 0.1 to 70 wt.%, preferably from 1 to 50 wt.%. If the surface layer is less than 0.1 wt.%, the desulfurization and demetallation activities lower within a short time. On the other hand, when the surface layer exceeds 70 wt.% of the catalyst, the desulfurization activity lowers appreciably.

For the manufacture of the catalyst of the dual structure according to the invention, various methods may be adopted without any limitations. For instance, the following methods are used.

(1) A method in which an active metals and an alumina sol are added to nickel-on-sepiolite and kneaded to obtain a slurry containing fine powder, followed by spraying the slurry over porous alumina containing active metals, drying at a temperature of from 50° to 300° C., and calcining at a temperature of from 300° to 800° C.

(2) A method in which a filter cake for producing porous alumina therefrom obtained at the time of preparation of porous alumina, and sepiolite powder containing nickel mixed with alumina sol are subjected to extrusion molding using a double tube so that the nickel-on-sepiolite is formed as the surface layer. Alternatively, the nickel-on-sepiolite is sprayed for coating. Thereafter, the molded articles are dried at a temperature of from 50° to 300° C. and calcined at a temperature of from 300° to 800° C. Then active metals are supported on the sepiolite surface layer or the like, by an impregnating or spraying technique, followed by drying at a temperature of from 50° to 300° C. and calcining at a temperature of from 300° to 800° C., thereby obtaining a catalyst.

(3) If fresh or regenerated hydrotreating catalysts are used as the core of the catalyst of the invention, the method (1) described above is appropriate.

As described before, the catalyst of the invention may take any forms including, for example, spheres and cylinders. The average corresponding diameter is generally in the range of from 0.1 to 10 mm, preferably from 0.3 to 3.0 mm.

The reason why the catalyst of the invention has high activity and long life is considered as follows. Asphaltene molecules are partially decomposed, with an active catalyst in macropores in the surface layer of the catalyst of the invention, into smaller-size molecules which are allowed to readily enter into micropores in the core of the catalyst. As a result, high activity is ensured. In addition, the macropores in the surface layer of the catalyst permit molecules to be readily diffused into the catalyst, so that metallic impurities deposit not only on the outer surfaces of the catalyst, but also on the interior of the catalyst, thus leading to prolongation of the life of the catalyst.

The catalyst of the invention is used for hydrotreating in a fixed bed reactor under conditions of a temperature of from 300° to 500° C., preferably from 350° to 430° C., a hydrogen pressure of from 40 to 250 atm., preferably from 60 to 200 atm., and a liquid space velocity of from 0.05 to 10 hr$^{-1}$, preferably from 0.1 to 5 hr$^{-1}$.

The catalyst of the invention holds, over a long term, high activities on desulfurization, demetallation and asphaltene decomposition. This effect is not achieved even if there is used a catalyst which is obtained by merely pulverizing and mixing the core component (1) and the surface layer component (2).

Moreover, when other types of clay minerals such as, for example, minerals containing montmorillonite are used without use of the surface layer component (2), the activities on the decomposition of asphaltene and elimination of metals are low as in the case where the components (1) and (2) are mixed together.

The present invention is particularly described by way of examples and comparative examples.

EXAMPLE 1

212 kg of sodium aluminate was added to 425 liters of ion-exchanged water and agitated, followed by adding 7.5 kg of an aqueous 50% gluconic acid solution and heating to 60° C. To the resulting solution was added an aqueous 16% aluminium sulfate solution until the pH reached 7.5. And the solution was allowed to stand for 1 hour and then filtered. Part of the resulting filter cake was dried at 130° C., followed by subjecting to the X-ray diffractometry, with the result that the resulting product was pseudo boehmite having a crystal diameter of 42 angstrom.

The resulting filter cake was kneaded in a kneader for about 6 hours after which the moisture content in the cake was controlled, followed by shaping it into cylinders having a diameter of 1.5 mm. After drying in air for 24 hours, the cylinders were dried at 130° C. for 5 hours and calcined at 550° C. for 3 hours to obtain porous alumina. The thus calcined product had such an X-ray diffraction pattern as the crystals of γ-alumina. The resulting porous alumina was immersed in an aqueous ammoniacal solution (pH: 9.3) containing ammonium molybdate and cobalt nitrate, followed by drying in air for 24 hours, drying at 130° C. for 5 hours, and calcining at 550° C. for 3 hours, thereby obtaining porous alumina (A) comprising 15 wt.% of $MoO_3$ and 5 wt.% of CoO. The thus obtained porous alumina (A) had a pore volume of 0.67 ml/g, a specific surface area of 269 $m^2/g$, and an average pore diameter of 100 angstrom.

Subsequently, there were provided sepiolite granules (in the form of 16 to 30 Tyler mesh) which was fibrous magnesium silicate having a composition, on the dry basis, of 59.0 wt.% of $SiO_2$, 25.6 wt.% of MgO, 1.9 wt.% of $Al_2O_3$, and 13.5 wt.% of crystal water and others, and which had a pore volume of 0.41 ml/g and a specific surface area of 151 $m^2/g$. The sepiolite granules were immersed in a 0.1N nickel nitrate solution in an amount of about two times the granules at 60° C. for 3 hours, thereby permitting Ni to be carried on by ion-exchange with magnesium. After drying at 130° C. for 5 hours, the sepiolite on which nickel had been carried was admixed with water in an amount of twice the sepiolite and 5 wt.% of alumina sol. The mixture was sufficiently kneaded and the granules were broken into pieces, followed by drying at 130° C. for 5 hours to obtain a powder of nickel-on-sepiolite (B). The thus obtained powder was immersed in a solution comprising ammonium molybdate and cobalt nitrate. The solution comprising the nickel-on-sepiolite powder was sprayed over porous alumina (A) to coat the nickel-on-sepiolite (C) thereon. After air-drying for 24 hours, the thus coated alumina was dried at 130° C. for 5 hours, and calcined at 500° C. for 2 hours to obtain a catalyst having a double structure consisting of core (A) and surface layer (C). The surface layer (C) had a composition of 0.02 wt.% of NiO, 15 wt.% of $MoO_3$, and 5 wt.% of CoO, with a specific surface area of 125 $m^2/g$ and an average pore diameter of 182 angstrom. The proportion of the core (A) in the catalyst was found to be 75 wt.% and the proportion of the surface layer was 25 wt.%.

Next, the catalyst was tested to hydrotreat a topped residue of Kafji. The test plant was a fixed bed system. The properties of a feedstock and test conditions are as follows.

| (1) | Properties of feedstock | |
|---|---|---|
| | Specific gravity (15/4° C.) | 0.981 |
| | Sulfur content (wt. %) | 4.27 |
| | Nitrogen content (ppm) | 2400 |
| | Pentane insolubles (wt. %) | 11.00 |
| | Vanadium (ppm) | 69 |
| | Nickel (ppm) | 19 |
| (2) | Test conditions | |
| | Temperature (°C.) | 380 |
| | Pressure (kg/$cm^2$G) | 140 |
| | Liquid space velocity ($hr^{-1}$) | 0.5 |
| | Hydrogen/feedstock ($NM^3$/K1 | 1000 |

The test results are shown in Table 1. From the results, it will be seen that the lowering of the desulfurization rate with an operation time is small, and thus features of the highly active and long-life catalyst are shown. In addition, the rate of demetallation will be found to be high.

TABLE 1

| Operation Time (hrs.) | 1,000 | 2,000 | 3,500 |
|---|---|---|---|
| S, wt. % | 1.54 | 1.92 | 2.19 |

TABLE 1-continued

| Operation Time (hrs.) | 1,000 | 2,000 | 3,500 |
|---|---|---|---|
| Ni + V, ppm | 27 | 33 | 10 |
| Desulfurization rate % | 63 | 55 | 50 |
| Demetallation rate % | 67 | 62 | 55 |

COMPARATIVE EXAMPLE 1

The porous alumina (A) comprising the active metal, obtained in Example 1, was used for the hydrotreating test under the same conditions as in Example 1. The results are shown in Table 2.

From the test results, it will be seen that although the desulfurization rate at an initial stage of operation was higher than the rate attained in Example 1, this activity lowers considerably in 3,500 hours. Thus, the life of the catalyst is very short.

TABLE 2

| Operation Time (hrs.) | 1,000 | 2,000 | 3,500 |
|---|---|---|---|
| S, wt. % | 1.28 | 1.79 | 3.07 |
| Ni + V, ppm | 46 | 51 | 70 |
| Desulfurization rate % | 70 | 58 | 28 |
| Demetallation rate % | 48 | 43 | 20 |

COMPARATIVE EXAMPLE 2

The fine powder of nickel-on-sepiolite (B) obtained in Example 1 was so controlled that the moisture content was 130%, followed by molding into cylinders having a diameter of 1.5 mm. The moldings wwere dried in air for 24 hours, dried at 130° C. for 5 hours, and calcined at 500° C. for 2 hours, thereby obtaining a nickel-on-sepiolite carrier.

The carrier was further immersed in an aqueous solution containing ammonium molybdate and cobalt nitrate, followed by drying and calcining at 500° C. for 2 hours to obtain a catalyst having nickel, molybdenum and cobalt supported on sepiolite.

The analysis of the thus obtained catalyst revealed that the catalyst contained 1 wt.% of NiO, 10 wt.% of $MoO_3$, and 1 wt.% of CoO, and had a pore volume of 0.45 ml/g, a specific surface area of 92 $m^2/g$, and an average pore diameter of 196 angstrom. This catalyst was subjected to the hydrotreating test under the same conditions as in Example 1. The results are shown in Table 3.

From the results of the table, it will be seen that the lowering rates of activities of desulfurization and demetallation with an operation time were almost the same as in Example 1, but the activities are very low.

TABLE 3

| Operation Time (hrs.) | 1,000 | 2,000 | 3,500 |
|---|---|---|---|
| S, wt. % | 1.96 | 2.34 | 2.56 |
| Ni + V, ppm | 40 | 45 | 51 |
| Desulfurization rate % | 54 | 45 | 40 |
| Demetallation rate % | 55 | 49 | 42 |

What is claimed is:

1. A catalyst for the hydrotreating of heavy hydrocarbon oils, comprising a double structure including a porous core (1), made chiefly of alumina, which possesses micropores having an average size smaller than 170 angstrom and has at least one active metal carried thereon, and a surface layer (2) made mainly of at least one clay mineral selected from the group consisting of sepiolite, halloysite, attapulgite, palygorskite and asbestos.

2. The catalyst according to claim 1, wherein the micropores have an average size of from 40 to 150 angstrom.

3. The catalyst according to claim 1, wherein the micropores have a volume of not less than 0.3 cc/g.

4. The catalyst according to claim 1, wherein said porous core is made of alumina.

5. The catalyst according to claim 1, wherein said porous core is made of a mixture of from 1 to 25 wt.% of at least one member selected from silica, boria, titania, magnesia, zirconia beryllia, chromia, zeolite, phosphorus and fluorine, and the balance alumina.

6. The catalyst according to claim 1, wherein the at least one active metal is applied to the surface layer.

7. The catalyst according to claim 1, wherein the at least one active metal is a transition metal of Group Vb, VIb, VIII or Ib of the Periodic Table and is used in an amount of from 0.1 to 20 wt.% of the total weight of the core and the surface layer, calculated as the metallic element.

8. The catalyst according to claim 7, wherein the at least one active metal is used in the form of a metallic element, metal oxide, or metal sulfide.

9. The catalyst according to claim 6 wherein the surface layer is made of a mixture of 1 to 45 wt.% of alumina, silica or silica-alumina, and the balance the at least one clay mineral.

10. The catalyst according to claim 1, wherein the proportion of the surface layer in the catalyst is in the range of from 0.1 to 70 wt.%.

11. The catalyst according to claim 1 wherein the core consists of porous alumina with 15% by weight of $MoO_3$ and 5% by weight of CoO and the surface layer contains 0.02% NiO, 15% $MoO_3$, 5% by weight of CoO.

12. The catalyst according to claim 1 wherein the average pore diameter of the surface layer is 100–700 angstroms.

13. The catalyst according to claim 1 wherein a solution of the powder of the surface layer (2) is prepared and the solution is sprayed onto said core (1).

14. The catalyst according to claim 8 wherein said active metal is vanadium, molybdenum, tungsten, chromium, cobalt, nickel or copper.

* * * * *